United States Patent
Starodubtsev et al.

(10) Patent No.: US 7,613,587 B2
(45) Date of Patent: Nov. 3, 2009

(54) METHOD FOR COMPENSATING FOR ACCELERATION VECTOR OFFSET, RECORDING MEDIUM STORING PROGRAM FOR EXECUTING THE METHOD, AND RELATED APPARATUS

(75) Inventors: Dmitry Starodubtsev, Suwon-si (KR); Byoung Kul Ji, Suwon-si (KR); KwangJo Jung, Suwon-si (KR); Dong Wook Lee, Suwon-si (KR); Tae-Hoon Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/594,199

(22) Filed: Nov. 8, 2006

(65) Prior Publication Data

US 2007/0118326 A1  May 24, 2007

(30) Foreign Application Priority Data

Nov. 9, 2005  (KR) ............... 10-2005-0107014

(51) Int. Cl.
G06F 15/00  (2006.01)
G01C 9/00  (2006.01)

(52) U.S. Cl. .............. 702/150; 702/151; 702/152; 702/153

(58) Field of Classification Search ......... 702/150–154, 702/179–184, 189–195, 199, 92, 94–96, 702/104, 141; 365/55, 60; 73/12.14, 488, 73/1.37–1.41, 507, 510; 360/75, 77.15, 69, 360/31

See application file for complete search history.

(56) References Cited

U.S. PATENT DOCUMENTS

| 5,982,573 A * | 11/1999 | Henze ...................... 360/75 |
| 6,738,214 B2 * | 5/2004 | Ishiyama et al. .......... 360/75 |
| 7,350,394 B1 * | 4/2008 | Flynn et al. ............... 73/1.38 |
| 2006/0103967 A1 * | 5/2006 | Kim et al. ................ 360/75 |

FOREIGN PATENT DOCUMENTS

| JP | 2000-241442 | 9/2000 |
| JP | 2002-100180 | 4/2002 |
| JP | 2003-263853 | 9/2003 |
| JP | 2005-078767 | 3/2005 |

* cited by examiner

*Primary Examiner*—Eliseo Ramos Feliciano
*Assistant Examiner*—Phuong Huynh
(74) *Attorney, Agent, or Firm*—Volentine & Whitt, PLLC

(57) ABSTRACT

Embodiments of the invention provide a method for compensating for an acceleration vector offset of an acceleration detector, a recording medium storing a program for executing the method, and an apparatus adapted to perform the method. The method comprises determining whether the acceleration detector is in a stable resting state; if the acceleration detector is determined to be in a stable resting state, then determining whether any one of at least two orthogonal axes is a main axis; and, if the acceleration detector is determined to be in a stable resting state and one of the at least two orthogonal axes is determined to be a main axis, performing an acceleration vector compensation operation to compensate for the acceleration vector offset of the acceleration detector.

18 Claims, 12 Drawing Sheets

FIG. 11

|  | RANDOM | Z DOWN |
|---|---|---|
| WITHOUT OFFSET COMPENSATION | 50 | 50 |
| WITH OFFSET COMPENSATION | 24 | 9 |

METHOD FOR COMPENSATING FOR ACCELERATION VECTOR OFFSET, RECORDING MEDIUM STORING PROGRAM FOR EXECUTING THE METHOD, AND RELATED APPARATUS

BACKGROUND

1. Field of the Invention

Embodiments of the invention relate to a method for compensating for an acceleration vector offset, a recording medium storing a program for executing the method, and an apparatus adapted to perform the method. In particular, embodiments of the invention relate to method for compensating for an acceleration vector offset of an acceleration sensor adapted to measure acceleration of a hard disk drive (HDD), a recording medium storing a program for executing the method, and an apparatus adapted to perform the method.

This application claims priority to Korean Patent Application No. 10-2005-0107014, filed on Nov. 9, 2005, the subject matter of which is hereby incorporated by reference in its entirety.

2. Description of Related Art

A hard disk drive (HDD) is a recording device adapted to store information. Information is recorded on concentric tracks on each of an upper and a lower surface of at least one magnetic disk. Each disk is mounted on a rotating spindle motor, and the information is accessed by a read/write head mounted on an actuator arm rotated by a voice coil motor (VCM). In order to move the read/write head, the VCM is rotated by applying electrical current. The read/write head reads the information recorded on a surface of a disk by sensing magnetic variations on the surface of the disk. A current is provided to the read/write head in order to record information on data tracks of the disk. The provided current generates a magnetic field for magnetizing the surface of the disk.

HDDs have been continuously reduced in size to the point where they can now be used in portable mobile devices such as laptop computers, MP3 players, cellular phones, and personal digital assistants (PDAs).

Portable mobile devices are frequently carried and thus are at risk of being dropped. Dropping a portable mobile device can cause damage (i.e., shock damage) to heads and disks of an HDD in the portable mobile device. Thus, in a portable mobile device comprising an HDD, the HDD needs to be protected when dropping or another motion that may cause damage to the HDD is predicted.

To protect both an HDD disposed in a portable mobile device and its data, technology that detects when an HDD is hit, dropped, or vibrated, and that unloads the heads of the HDD, if necessary, has been introduced. The purpose of that technology is to protect an HDD from damage that may be caused by a hit, drop, or vibration. An example of such technology is disclosed in published Japanese Patent Nos. 2000-99182 and 2002-8336, the subject matter of which is hereby incorporated by reference. The technology relates to detecting a free-fall state using a free-fall sensor (FFS), and retracting the head(s) of an HDD when the free-fall state is detected.

FIG. 1 is a perspective view of an acceleration detector. The acceleration detector is a 3-axis acceleration detector. Referring to FIG. 1, a FFS 50 comprises a mass 52 and piezo elements 54 attached to mass 52. Mass 52 is subject to movement in the x, y, and z directions in correspondence with motion of an HDD incorporating FFS 50. Movement of mass 52 defines the respective amplitudes of electrical-signals generated by piezo elements 54. A vector of movement and/or a vector of acceleration for mass 52 may be calculated in relation to the respective electrical signals indicating movement in the x, y, and z directions. A free-fall state may be indicated by the calculated vector(s) of movement and acceleration.

FIGS. 2 and 3 are diagrams for explaining a method for detecting a free-fall state for an HDD. A vector of acceleration representing the aggregated values in each of the principal axes of measurement may be used to detect a free-fall state. That is, as conceptually illustrated in FIG. 2, a falling HDD will experience acceleration under the influence of gravity. Detection of this acceleration indicates a a free-fall state for the HDD.

When an acceleration vector is used as a free-fall indicator, it may be calculated as the sum of acceleration vectors in the three principal axes. This aggregate vector value may then be compared to a threshold value "Th" defined in relation to a sample time period "$T_{fall}$". As further illustrated in FIG. 3, when a free-fall state for an HDD is recognized, a free-fall detection signal "DETECT FREE-FALL" is generated. When the free-fall detection signal "DETECT FREE-FALL" is generated, the HDD performs a retract operation adapted to park or unload the read/write head(s) of the HDD.

However, the conventional FFS 50 typically suffers from an acceleration vector offset, which is an amount by which a measured acceleration vector differs from a corresponding actual acceleration vector. The acceleration vector offset is commonly referred to as an "0G offset", and may be though of as an acceleration vector initially influencing FFS 50 even when this device is at rest. As used herein, the indication "G" denotes the acceleration of gravity (i.e., 9.8 m/sec$^2$). Because the acceleration vector offset is a measurement error related to an actual acceleration measurement, the acceleration vector offset must be compensated for to order to properly detect and indicate a free-fall state using an acceleration vector. The acceleration vector offset may be caused by variations in ambient operating temperature, supply voltage, and manufacturing process.

Each of the three axes of measurement for FFS 50 may include an acceleration value offset. An acceleration value offset is the difference between a measured acceleration value and a corresponding actual acceleration value. An acceleration vector offset, which is the vector sum of the acceleration value offsets for the three axes, may result in false positives or false negatives when detecting whether the FFS 50 is free-falling (i.e., in a free-fall state).

FIGS. 4A and 4B are graphs illustrating false negative and false positive detection of a free-fall state, respectively. False negative detection of free-fall occurs when, as illustrated in FIG. 4A, measured acceleration vectors are offset from corresponding actual acceleration vectors in a positive direction (i.e., each measured acceleration vector is greater than the corresponding actual acceleration vector). False negative detection of free-fall means that, even though the FFS 50 is in the free-fall state, the FFS 50 does not detect that the FFS 50 is in the free-fall state.

False positive detection of free-fall occurs when, as illustrated in FIG. 4B, measured acceleration vectors are offset from corresponding actual acceleration values in a negative direction (i.e., each measured acceleration vector is less than the corresponding actual acceleration vector). False positive detection of free-fall means that the FFS 50 detects that the FFS 50 is in the free-fall state even though it is not.

Thus, the acceleration vector offset suffered by the FFS 50 must be compensated for so that free-fall can be detected accurately so that an HDD will perform retract operations at the appropriate times.

SUMMARY OF THE INVENTION

Embodiments of the invention provide a method for compensating for an acceleration vector offset of an acceleration detector, a recording medium storing a program for executing the method, and an apparatus adapted to perform the method.

One aspect of the invention provides a method for compensating for an acceleration vector offset of an acceleration detector adapted to output measured acceleration values for at least two orthogonal axes. The method comprises determining whether the acceleration detector is in a stable resting state by evaluating measured acceleration vectors obtained during a first time period, wherein the measured acceleration vectors are calculated using the measured acceleration values. The method further comprises, if the acceleration detector is determined to be in a stable resting state, then determining whether any one of the at least two orthogonal axes is a main axis using the measured acceleration values; and, if the acceleration detector is determined to be in a stable resting state and one of the at least two orthogonal axes is determined to be a main axis, performing an acceleration vector compensation operation to compensate for the acceleration vector offset of the acceleration detector.

Another aspect of the invention provides a computer-readable recording medium storing a program for executing a method for compensating for an acceleration vector offset of an acceleration detector adapted to output measured acceleration values for at least two orthogonal axes. The method comprises determining whether the acceleration detector is in a stable resting state by evaluating measured acceleration vectors obtained during a first time period, wherein the measured acceleration vectors are calculated using the measured acceleration values. The method further comprises, if the acceleration detector is determined to be in a stable resting state, then determining whether any one of the at least two orthogonal axes is a main axis using the measured acceleration values; and, if the acceleration detector is determined to be in a stable resting state and one of the at least two orthogonal axes is determined to be a main axis, performing an acceleration vector compensation operation to compensate for the acceleration vector offset of the acceleration detector.

Still another aspect of the invention provides an apparatus adapted to compensate for an acceleration vector offset of an acceleration detector. The apparatus comprises the acceleration detector, wherein the acceleration detector is adapted to output measured acceleration values for at least two orthogonal axes; and, a controller adapted to compensate for the acceleration vector offset of the acceleration detector. The controller is adapted to determine whether the acceleration detector is in a stable resting state by evaluating measured acceleration vectors obtained during a first time period, wherein the measured acceleration vectors are calculated using the measured acceleration values; determine whether any one of the at least two orthogonal axes is a main axis using the measured acceleration values, if the acceleration detector is determined to be in a stable resting state; and, perform an acceleration vector compensation operation to compensate for the acceleration vector offset of the acceleration detector, if the acceleration detector is determined to be in a stable resting state and one of the at least two orthogonal axes is determined to be a main axis.

BRIEF DESCRIPTION OF THE DRAWINGS

Embodiments of the invention will be described with reference to the accompanying drawings, in which like reference symbols indicate like or similar elements throughout. In the drawings:

FIG. 11 is a table illustrating results obtained by performing a free-fall detection false positive test;

DESCRIPTION OF EMBODIMENTS

Figure 1:
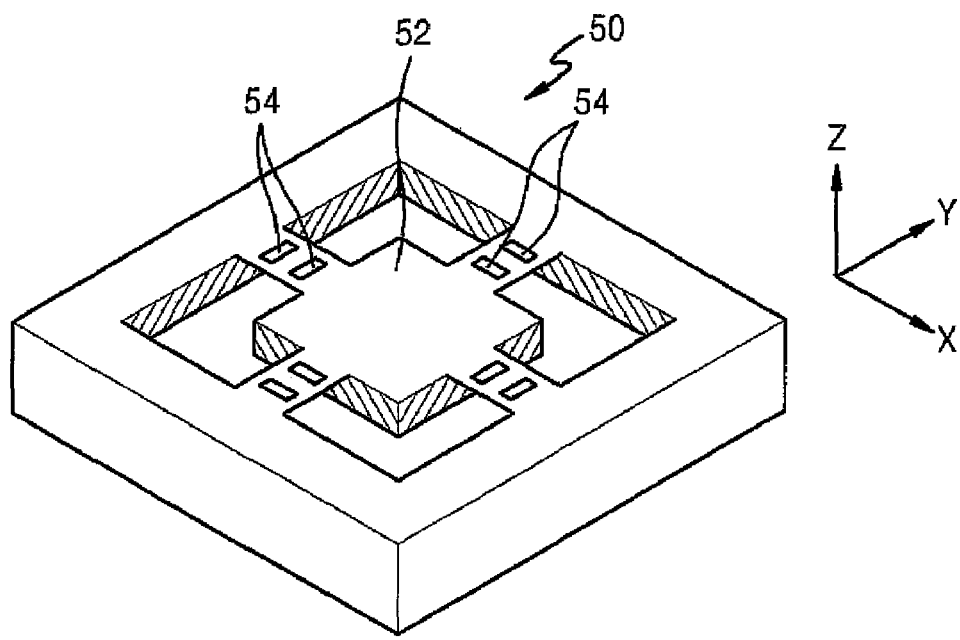
FIG. 1 is a perspective view of an acceleration detector.

If an acceleration vector a has no offset, then the acceleration vector a may be obtained using Equation 1.

$$a = \sqrt{a_x^2 + a_y^2 + a_z^2} \qquad (1)$$

As used herein, x-, y-, and z-axes are defined in relation to a free-fall sensor (FFS), and $a_x$, $a_y$, and $a_z$ are measured acceleration values for the x-, y-, and z-axes, respectively, measured by the FFS when there is no acceleration vector offset in the FFS.

In reality, however, measured acceleration values output by an FFS differ from the corresponding ideal measurement values due to offsets (i.e., acceleration value offsets) in the FFS. In addition, each axis may have a different acceleration value offset.

When taking the offsets into account, measured acceleration values $a_{xm}$, $a_{ym}$, and $a_{zm}$ for the x-, y-, and z-axes, respectively, are obtained using the set of Equations 2.

$$a_{xm} = a_x + \Delta a_x$$

$$a_{ym} = a_y + \Delta a_y$$

$$a_{zm} = a_z + \Delta a_z \qquad (2)$$

As used herein, $\Delta a_x$, $\Delta a_y$, and $\Delta a_z$ are acceleration value offsets for the x-, y-, and z-axes, respectively.

When measured acceleration values have acceleration value offsets, a measured acceleration vector $a_m$ is obtained using Equation 3.

$$a_m = \sqrt{(a_x+\Delta a_x)^2+(a_y+\Delta a_y)^2+(a_z+\Delta a_z)^2} = a+\Delta a \quad (3)$$

As used herein, $\Delta a$ is an acceleration vector offset. In addition, as used herein, when a value or vector is said to "have" or "comprise" an offset, it means that the value or vector differs from the corresponding actual value or vector by the amount of the offset. Also, as used herein, when a measured acceleration vector $a_m$ is said to be "obtained" it means that measured acceleration values are obtained from an acceleration detector and the measured acceleration vector $a_m$ is calculated from the measured acceleration values.

Although the acceleration value offsets $\Delta a_x$, $\Delta a_y$, and $\Delta a_z$ of Equation 3 cannot be measured, the acceleration vector offset $\Delta a$ can be estimated when certain conditions are satisfied.

As used herein, when an acceleration detector is said to be in a "stable resting state" it means that the acceleration detector is not accelerating in any direction. In addition, an FSS is an acceleration detector. Additionally, as used herein, $a_g$ is the acceleration vector for the FFS when the FFS is not accelerating in any direction. So, assuming that the FFS is in a stable resting state, the acceleration vector offset $\Delta a$ can be obtained using Equation 4.

$$\Delta a = a_m - a_g \quad (4)$$

The acceleration vector $a_g$ can be obtained from a specification for the FSS provided by the manufacturer of the FFS. Thus, the acceleration vector offset $\Delta a$ can be calculated by subtracting the acceleration vector $a_g$ (provided by the manufacturer) from the measured acceleration vector $a_m$, wherein the measured acceleration vector $a_m$ comprises an acceleration vector offset $\Delta a$ in a stable resting state, and wherein the acceleration vector offset comprises a plurality of components.

However, even when the FFS is in a stable resting state, components of the acceleration vector offset $\Delta a$ cannot be calculated using only Equation 4 because the respective acceleration value offsets $\Delta a_x$, $\Delta a_y$, and $\Delta a_z$ of the x-, y-, and z-axes, respectively, may be different from one another, as described above.

For example, even when the FFS is in a stable resting state, the measured acceleration values of x-, y-, and z-axes may vary in accordance with an initial state for the HDD.

However, the acceleration vector offset $\Delta a$ can be estimated when the following conditions are met: (1) the HDD is in a stable resting state for at least a predetermined amount of time; and (2) the absolute value of the measured acceleration value for a main axis selected from among the x-axis, the y-axis, and the z-axis is much greater than the respective measured acceleration values for the remaining axes. As used herein, a "main axis" is an axis oriented substantially towards the center of the Earth, and one of the axes of the FFS is a main axis if that axis is oriented substantially towards the center of the Earth.

It is possible to fully satisfy condition (1) because the HDD is not always in motion, and it is also possible to fully satisfy condition (2) because the HDD can be laid on a plane substantially parallel to the ground for at least a predetermined amount of time.

The measured acceleration vector value offset $\Delta a$ can be obtained using Equation 5.

$$\Delta a = f(\Delta a_x, \Delta a_y, \Delta a_z) \quad (5)$$

The acceleration vector offset $\Delta a$ is non-linear with respect to the acceleration value offsets $\Delta a_x$, $\Delta a_y$, and $\Delta a_z$ for the x-, y-, and z-axes, respectively. However, if any one of the acceleration value offsets $\Delta a_x$, $\Delta a_y$, and $\Delta a_z$ is much greater than the others, the acceleration vector offset $\Delta a$ of Equation 5 can be approximated using Equation 6.

$$\Delta a \approx f(\Delta a_i) \quad (6)$$

As used herein, $\Delta a_i$ denotes the acceleration value offset of the main axis i, which is either the x-, y-, or z-axis. As used herein, i stands for one of x, y, and z.

If the HDD is laid flat on a plane substantially parallel to the ground, the main axis (which is usually the z-axis) is oriented to the center of the Earth, and the other axes are parallel to the surface of the Earth. When the HDD is oriented in this way, the measured acceleration value for the main axis actually determines the measured acceleration vector $a_m$.

Figure 5:
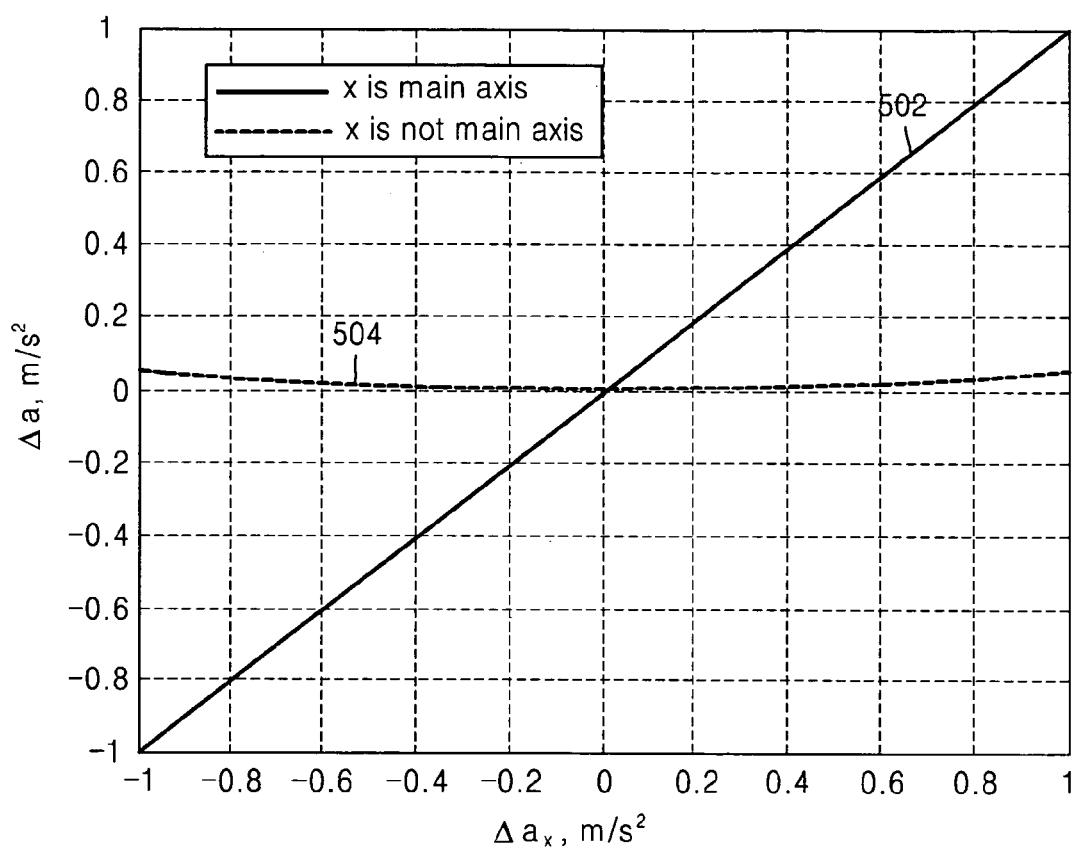
FIG. 5 is a diagram illustrating variation in an acceleration vector offset in accordance with variation in an acceleration value offset.

FIG. 5 is a diagram illustrating variation in an acceleration vector offset $\Delta a$ in accordance with variation in an acceleration value offset $\Delta a_x$. In FIG. 5, the vertical axis represents the magnitude of the acceleration vector offset $\Delta a$ and the horizontal axis represents the acceleration value offset $\Delta a_x$. In addition, in FIG. 5, reference numeral 502 indicates a line illustrating a relationship between the acceleration vector offset $\Delta a$ and the acceleration value offset $\Delta a_x$ when the x-axis is the main axis, and reference numeral 504 indicates a curve illustrating a relationship between the acceleration vector offset $\Delta a$ and the acceleration value offset $\Delta a_x$ when the x-axis is not the main axis.

Referring to FIG. 5, while the acceleration vector offset $\Delta a$ varies linearly with respect to the acceleration value offset $\Delta a_x$ when the x-axis is the main axis, the acceleration vector offset $\Delta a$ varies only slightly with respect to acceleration value offsets of axes that are not the main axis (i.e., with respect to the acceleration value offset $\Delta a_x$ when the x-axis is not the main axis).

Thus, the acceleration vector offset $\Delta a$ can be sufficiently compensated for (i.e., a sufficient compensation effect can be obtained) by compensating for only the acceleration value offset of the main axis.

Figure 6:
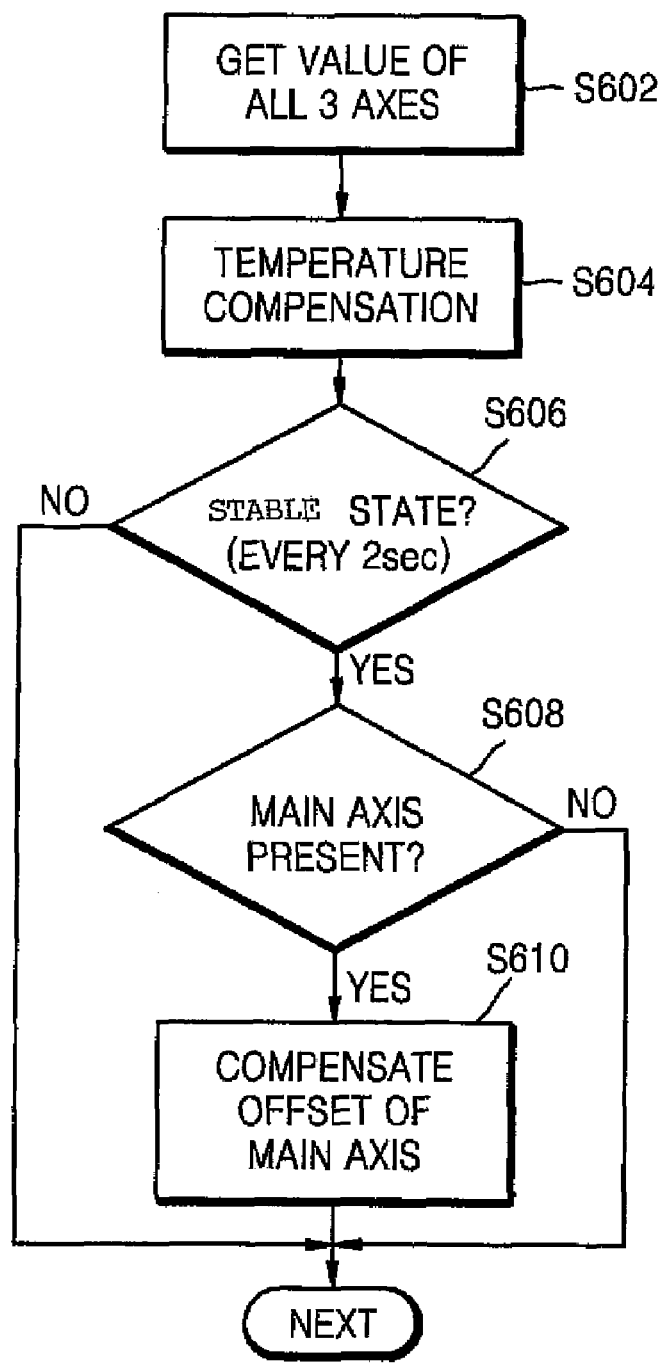
FIG. 6 is a flowchart illustrating a method for compensating for an acceleration vector offset in an acceleration detector in accordance with an embodiment of the invention.

FIG. 6 is a flowchart illustrating a method for compensating for an acceleration vector offset in an acceleration detector in accordance with an embodiment of the invention. The method for compensating for an acceleration vector offset in an acceleration detector, in accordance with an embodiment of the invention, will now be described with reference to FIG. 6.

At step S602, the measured acceleration values $a_{xm}$, $a_{ym}$, and $a_{zm}$ of the x-, y-, and z-axes, respectively, are obtained from the FFS.

At step S604, a temperature compensation operation is performed in order to influence the measured acceleration values $a_{xm}$, $a_{ym}$, and $a_{zm}$ of the x-, y-, and z-axes, respectively. The measured acceleration values $a_{xm}$, $a_{ym}$, and $a_{zm}$ measured by the FFS vary linearly with temperature. Thus, the temperature compensation operation is performed. In addition, the temperature compensation operation is performed in proportion to a difference between a measured temperature and a reference temperature in order to influence the measured acceleration values $a_{xm}$, $a_{ym}$, and $a_{zm}$.

Figure 2:
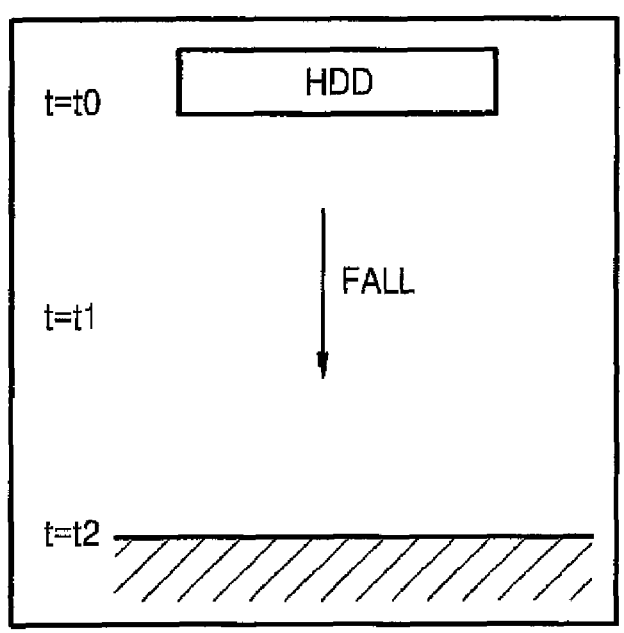
FIGS. 2 and 3 are diagrams for explaining a method for detecting free-fall.
Figure 3:
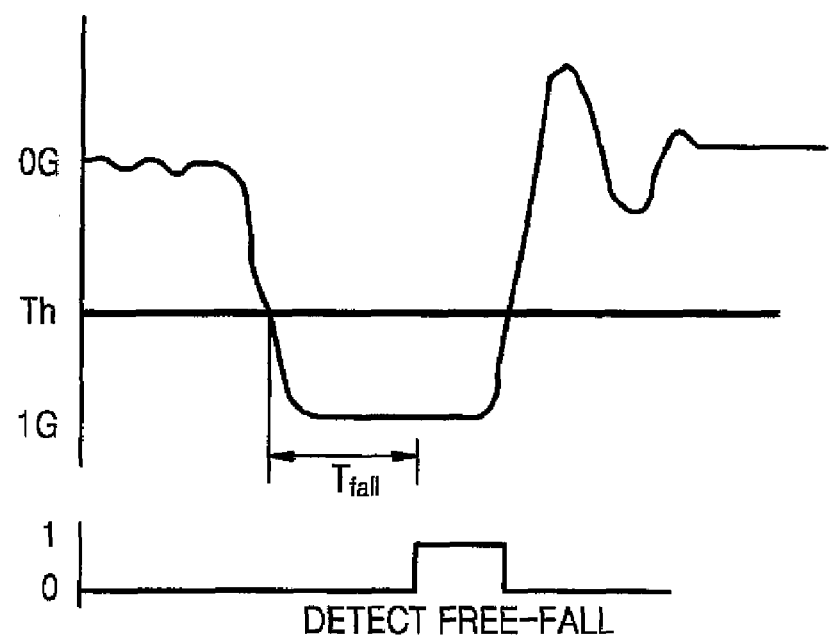
Figure 4A:
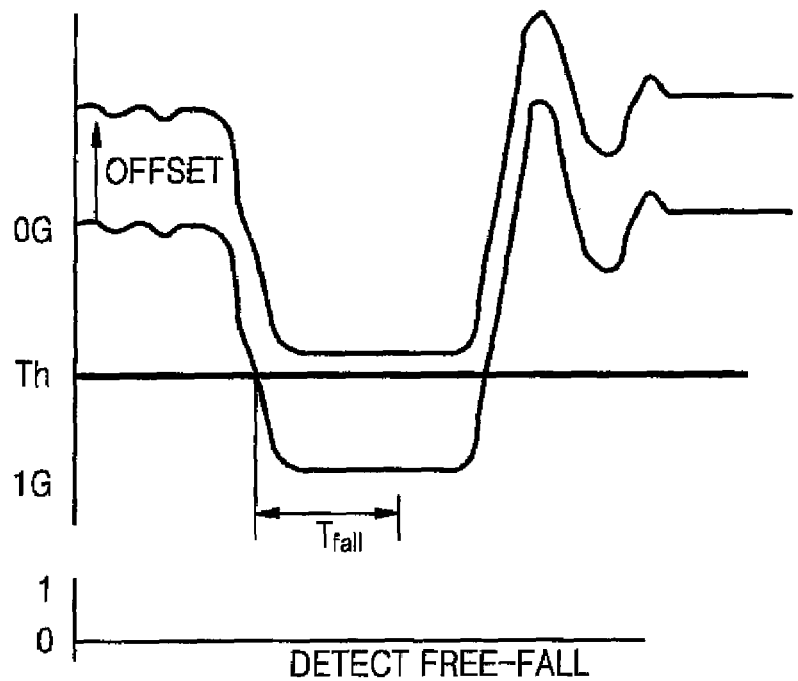
FIGS. 4A and 4B are graphs illustrating false negative and false positive detection of free-fall, respectively.
Figure 4B:
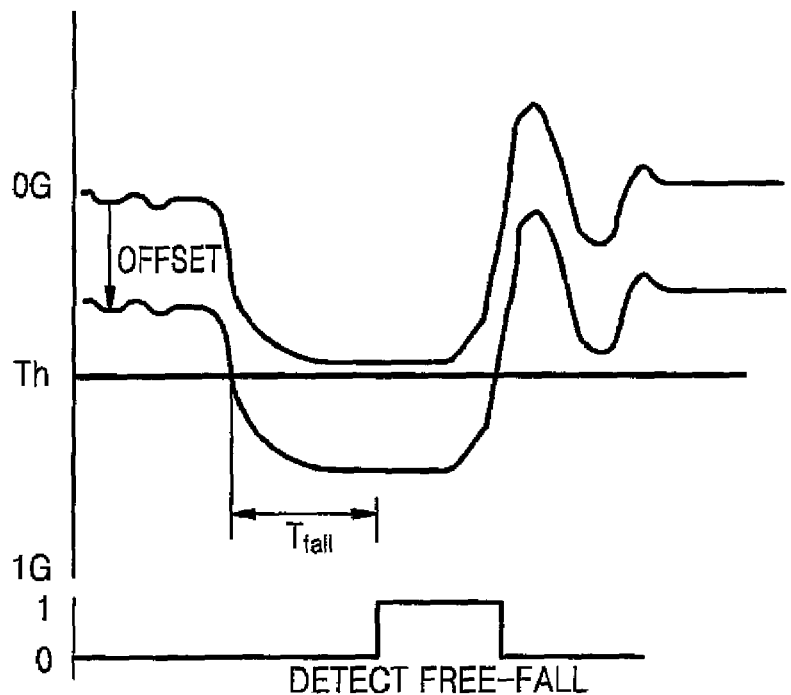

At step S606, whether or not the FFS is in a stable resting state is determined. If the FFS is determined not to be in a stable resting state, offset compensation is not performed, and a free-fall detection process (as illustrated in FIGS. 2 and 3) is performed. If the FFS is determined to be in a stable resting state, then the method proceeds to step S608.

At step S608, whether or not one of the axes of the FFS is a main axis is determined. As described previously, one of the axes of the FFS is a main axis if it is oriented substantially towards the center of the Earth. If, at step S608, none of the axes is determined to be a main axis (i.e., if a main axis is not present), then offset compensation is not performed and a free-fall detection process as illustrated in FIGS. 2 and 3 is performed. If, at step S608, one of the axes of the FFS is determined to be a main axis (i.e., if a main axis is present), then the method proceeds to step S610 to perform an acceleration vector offset compensation operation.

At step S610, an acceleration vector offset compensation operation, which is a process for compensating for the acceleration vector offset of the FFS, is performed at least once. In accordance with an embodiment of the invention, the acceleration vector offset compensation operation compensates for the acceleration vector offset of the FFS by compensating for the acceleration value offset of the main axis.

Various of the steps described above with reference to FIG. 6 will now be described in more detail.

A method for determining whether the FFS is in a stable resting state, in accordance with an embodiment of the invention, will now be described with reference to FIGS. 7A through 7C, which show variation in measured acceleration vectors and data related to the variation in the measured acceleration vectors.

Figure 7A:
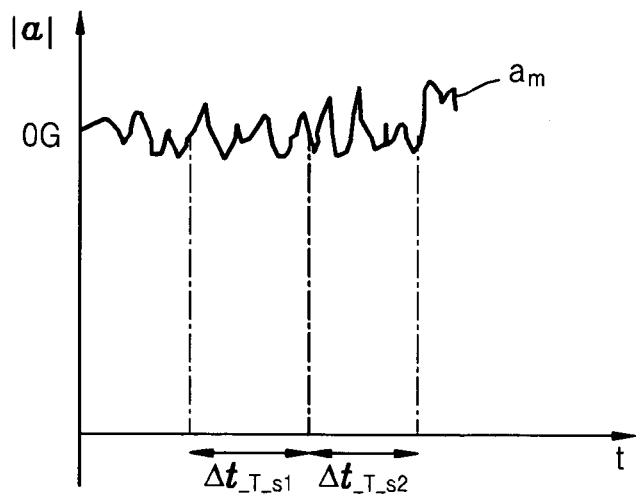
FIGS. 7A through 7C show variation in measured acceleration vectors and data related to the variation in the measured acceleration vectors.
Figure 7B:
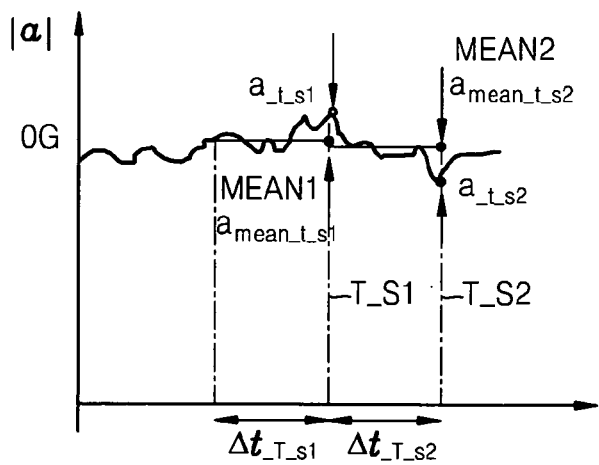
Figure 7C:
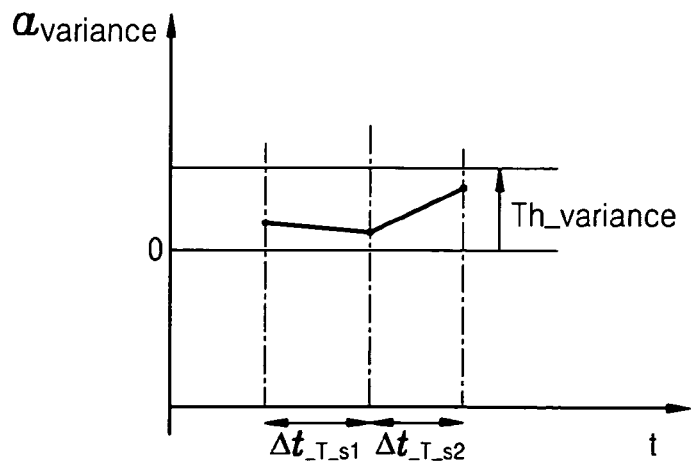

Referring to FIG. 7, to determine whether the FFS is in a stable resting state, for each time interval having a length equal to Δt (in FIG. 7, tΔ_$T\_s1$ and tΔ_$T\_s1$ each have a length equal to Δt), data related to the measured acceleration vectors $a_m$ shown in FIG. 7A is evaluated. In accordance with an embodiment of the invention, for each time interval (i.e., sampling period) having a length equal to Δt, a variance $a_{variance}$ of the measured acceleration vector $a_m$ is compared to a variance threshold (i.e., reference value) and a mean $a_{mean}$ of the measured acceleration vector $a_m$ is compared to a mean range (i.e., mean reference values).

For example, if a measured acceleration vector $a_m$ is obtained (i.e., measured) every 2 ms, a measured acceleration vector $a_m$ is obtained 100 times over the course of 2 seconds. For each 2-second period of time during which measured acceleration vectors $a_m$ are obtained, the variance $a_{variance}$ and the mean $a_{mean}$ of the measured acceleration vectors $a_m$ obtained during that 2-second time period are calculated and compared to a threshold value and a range, respectively, and whether or not the FFS is in a stable resting state is determined in accordance with the results of the comparisons.

Still referring to FIG. 7, in accordance with an embodiment of the invention, the FFS is determined to be in a stable resting state if the difference between the mean $a_{mean}$ of the measured acceleration vectors $a_m$ obtained during a time period Δt and the measured acceleration vector $a_m$ obtained at the final edge T_s (i.e., at the end) of the time period Δt is within a mean range Th_min_mean to Th_max_mean and the variance $a_{variance}$ of the measured acceleration vectors $a_m$ obtained during the time period Δt is below a variance threshold Th_variance.

If the variance $a_{variance}$ of the measured acceleration vectors $a_m$ obtained during a time period Δt is greater than the variance threshold Th_variance, or if the difference between the mean $a_{mean}$ of the measured acceleration vectors $a_m$ obtained during a time period Δt and the measured acceleration vector $a_m$ obtained at an edge T_s (i.e., at the end) of the time period Δt is greater than the threshold Th_max_mean or smaller than threshold Th_min_mean (i.e., is within a mean range Th_max_mean to Th_min_mean), the FFS is determined to not be in a stable resting state. That is, the acceleration vector offset compensation operation is not performed.

As an example, referring to FIG. 7, the FFS is determined to be in a stable resting state if, referring to a first time period tΔ_$T\_s1$, the difference between the mean $a_{mean\_t\_s1}$ of the measured acceleration vectors $a_m$ obtained during a first time period tΔ_$T\_s1$ and the measured acceleration vector $a_{t\_s1}$ obtained at the final edge T_s1 of first time period tΔ_$T\_s1$ is within a mean range Th_min_mean to Th_max_mean, and the variance $a_{variance}$ of the measured acceleration vectors $a_m$ obtained during the first time period tΔ_$T\_s1$ is below a variance threshold Th_variance.

In accordance with an embodiment of the invention, the time period Δt may be set to have a length of at most 2 seconds. When an HDD free-falls for 2 seconds the HDD falls 25 m, so variations in the measured acceleration vector $a_m$ do not need to be evaluated for a period of time longer than 2 seconds. Thus, if there is relatively low variation in the measured acceleration vectors $a_m$ obtained during a time period of up to 2 seconds, it can be determined that the FFS is in a stable resting state.

Figure 8A:
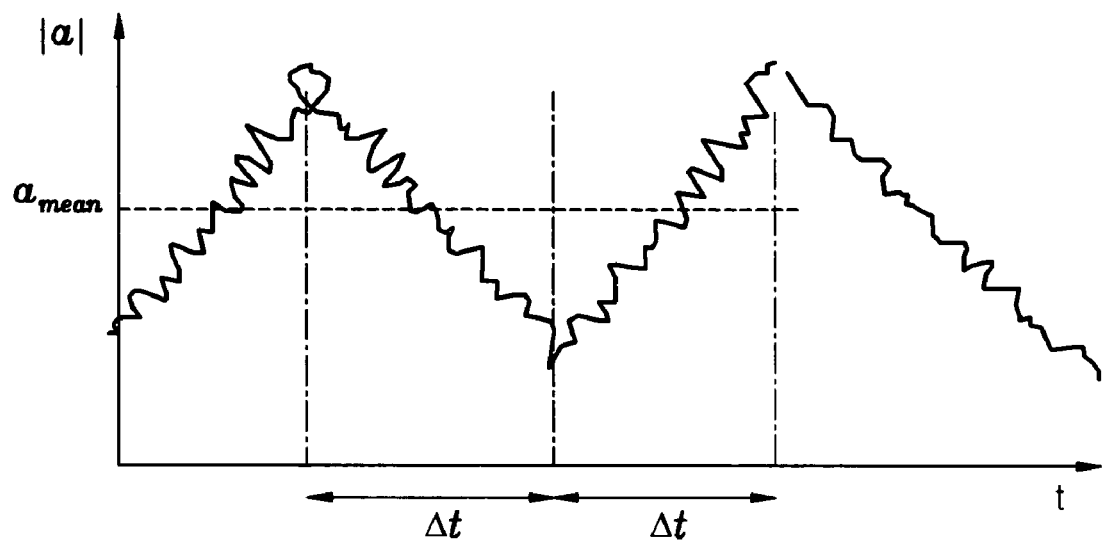
FIGS. 8A and 8B are diagrams illustrating variance in measured acceleration vectors.
Figure 8B:
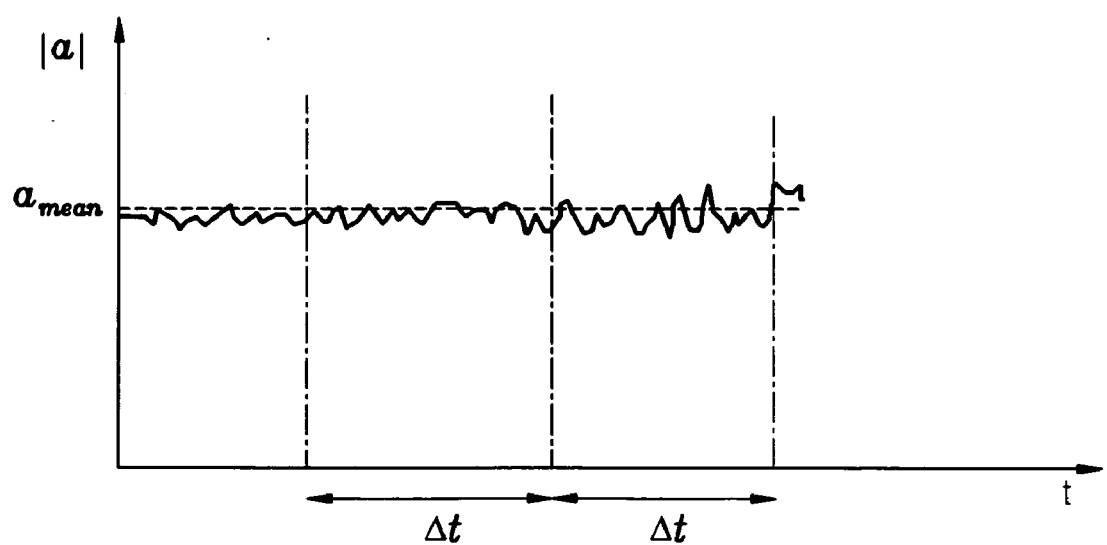

FIGS. 8A and 8B are diagrams illustrating variance in measured acceleration vectors $a_m$. FIG. 8A illustrates a scenario in which the variance $a_{variance}$ of measured acceleration vectors $a_m$ is relatively great and FIG. 8B illustrates a scenario in which the variance $a_{variance}$ of measured acceleration vectors $a_m$ is relatively small. When the variance $a_{variance}$ of the measured acceleration vector $a_m$ is relatively great, measured acceleration vectors $a_m$ measured every 2 ms vary significantly (i.e., the acceleration detector is experiencing a relatively large amount of motion), while the mean $a_{mean}$ of the measured acceleration vector $a_m$ measured for 2 seconds may be constant. Thus, even if the mean $a_{mean}$ of the measured acceleration vector $a_m$ is constant, if the variance $a_{variance}$ of the measured acceleration vector $a_m$ is relatively great, the corresponding FFS cannot be determined to be in a stable resting state.

Since variations of measured acceleration vectors $a_m$ may be significantly high due to noise, a moving average value may be used. In accordance with one embodiment of the invention, a moving average of four samples may be used.

Since measured acceleration vectors $a_m$ may vary gradually and slowly, a measured acceleration vector $a_m$ is sampled at the edge (i.e., end) of each sampling period.

Referring again to FIG. 6, as described above, if the FFS is determined to be in a stable resting state, and thus a first condition for performing an acceleration vector compensation operation is satisfied, then whether or not one of the axes of the FFS is a main axis is determined at step S608.

To determine which axis (if any) is the main axis, the set of Equations 7 is used.

$$|a_{xm}| \geq (|a_{ym}| + |a_{zm}|)$$
$$|a_{ym}| \geq (|a_{xm}| + |a_{zm}|)$$
$$|a_{zm}| \geq (|a_{xm}| + |a_{ym}|)$$
(7)

If any one of the equations of the set of Equations 7 is satisfied, the acceleration vector offset compensation operation is performed using the i-axis corresponding to the measured acceleration value $a_{im}$ on the left-hand-side of the satisfied equation as the main axis. Measured acceleration value $a_{im}$ is a measured acceleration value for the i-axis, which, as described previously, is one of the x-, y-, and z-axes.

When $a_i$ is the measured acceleration value for the main axis when the measured acceleration value for the main axis comprises no acceleration value offset (i.e., measured acceleration value $a_i$ is the actual acceleration value for the main axis) and $a_{im}$ is the measured acceleration value for the main axis when the measured acceleration value for the main axis comprises an acceleration value offset $\Delta a_i$ (i.e., $a_{im}=a_i+\Delta a_i$), an acceleration compensation value $\Delta a_{iadj}$ for the main axis is obtained using Equation 8.

$$a_i = a_{im} + \Delta a_{iadj} = a_i + \Delta a_i + \Delta a_{adi}$$

$$\Delta a_{iadj} = -\Delta a_i \qquad (8)$$

When the FFS is in a stable resting state and a main axis exists, the acceleration value offset $\Delta a_i$ for the main axis can be approximated as the acceleration vector offset $\Delta a$. Thus, the main axis acceleration compensation value $\Delta a_{iadj}$ is obtained using Equation 9.

$$\Delta a_{iadj} = -(\Delta a) \qquad (9)$$

In reality, the operation for compensating for the acceleration value offset for the main axis $\Delta a_i$ is performed in relation to the sign of the acceleration vector offset $\Delta a$ and the sign of the acceleration value offset for the main axis $\Delta a_i$. In addition, the operation for compensating for the acceleration value offset for the main axis $\Delta a_i$ is performed iteratively, and the main axis acceleration compensation value $\Delta a_{iadj}$ for each iterative step may be obtained using Equation 10.

$$\Delta a_{iadjcur} = \Delta a_{iadjpre} + (\Delta a/2) \cdot \text{sign}(\Delta a) \cdot \text{sign}(a_i) \cdot (-1) \qquad (10)$$

As used herein, $\Delta a_{iadjcur}$ denotes a compensation value to be applied in the current step and $\Delta a_{iadjpre}$ denotes a compensation value that was applied in the previous step. The value (−1) at the end of Equation 10 ensures that the current compensation value $\Delta a_{iadjcur}$ has an opposite sign compared to the previous compensation value $\Delta a_{iadjpre}$ (i.e., the current compensation step is performed in the opposite direction compared to the previous compensation step). In the initial compensation step, $\Delta a_{iadjpre}$ is 0.

Referring again to FIG. 6, in step S610, the compensation operation performed using the compensation value obtained using Equation 10 is repeated until the main axis acceleration compensation value $\Delta a_{iadj}$ is smaller than a predetermined value.

Figure 9A:
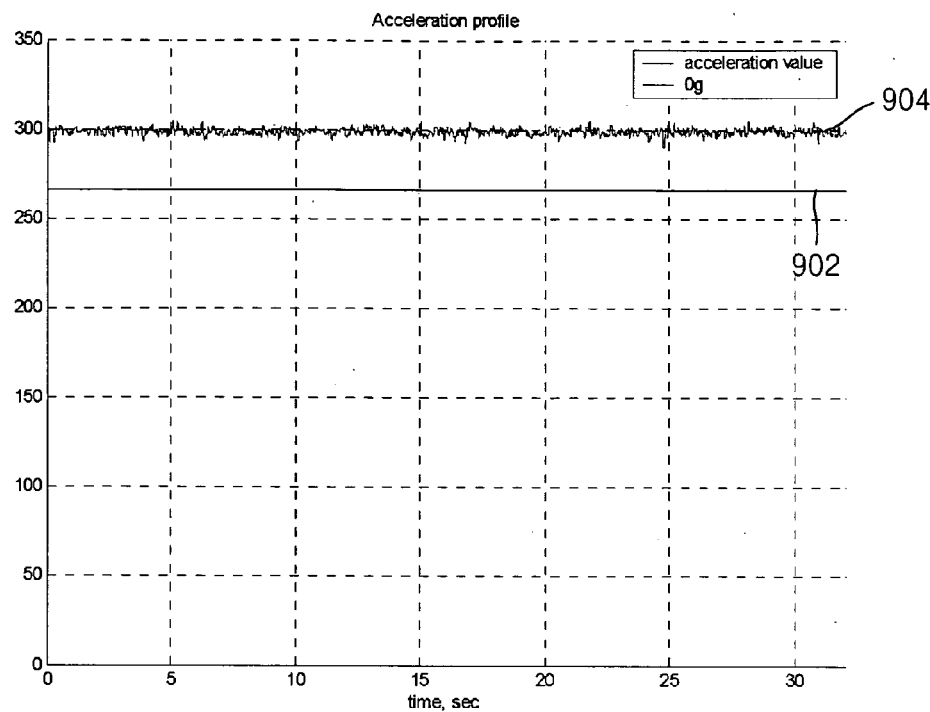
FIG. 9A shows acceleration vector data when an acceleration vector offset compensation operation is not performed.
Figure 9B:
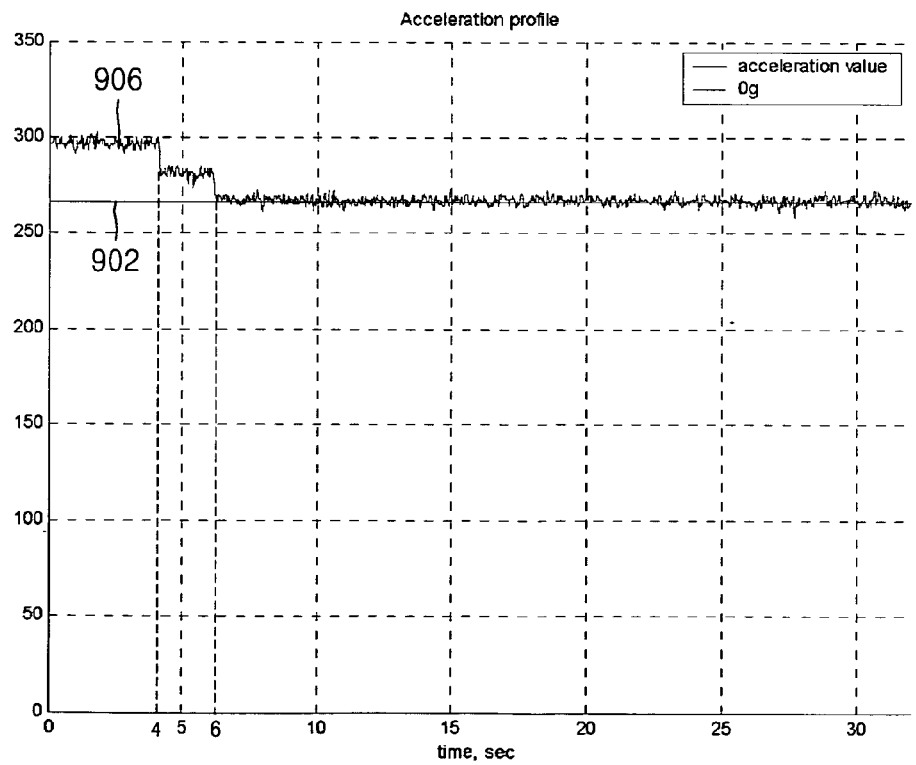
FIG. 9B shows the result of a method for performing an acceleration vector offset compensation operation in accordance with an embodiment of the invention.

FIG. 9A shows acceleration vector data when an acceleration vector offset compensation operation is not performed, and FIG. 9B shows the result of a method for performing an acceleration vector offset compensation operation in accordance with an embodiment of the invention. In FIGS. 9A and 9B, line 902 denotes acceleration vector $a_g$, which comprises no acceleration vector offset $\Delta a$, and curves 904 and 906 each denote a measured acceleration vector $a_m$.

Referring to FIG. 9B, the acceleration vector offset compensation operation is performed in steps of half of the initial acceleration vector offset over a period of 2 seconds.

Figure 10A:
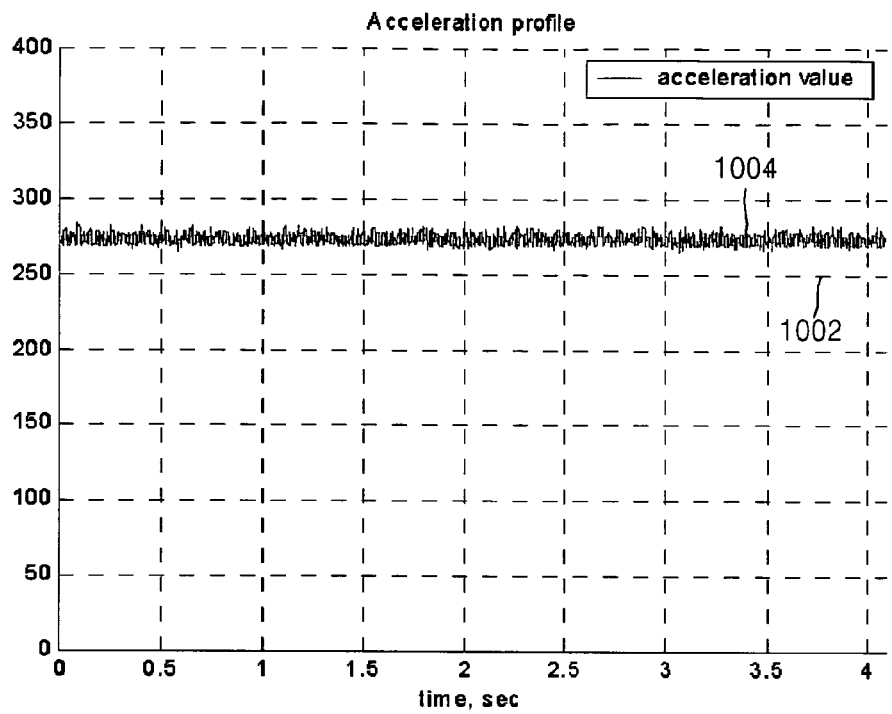
FIGS. 10A and 10B show the result obtained by performing an acceleration vector offset compensation operation by compensating for an acceleration value offset of a z-axis of an acceleration detector in accordance with an embodiment of the invention, wherein the z-axis is oriented substantially towards the center of the Earth.
Figure 10B:
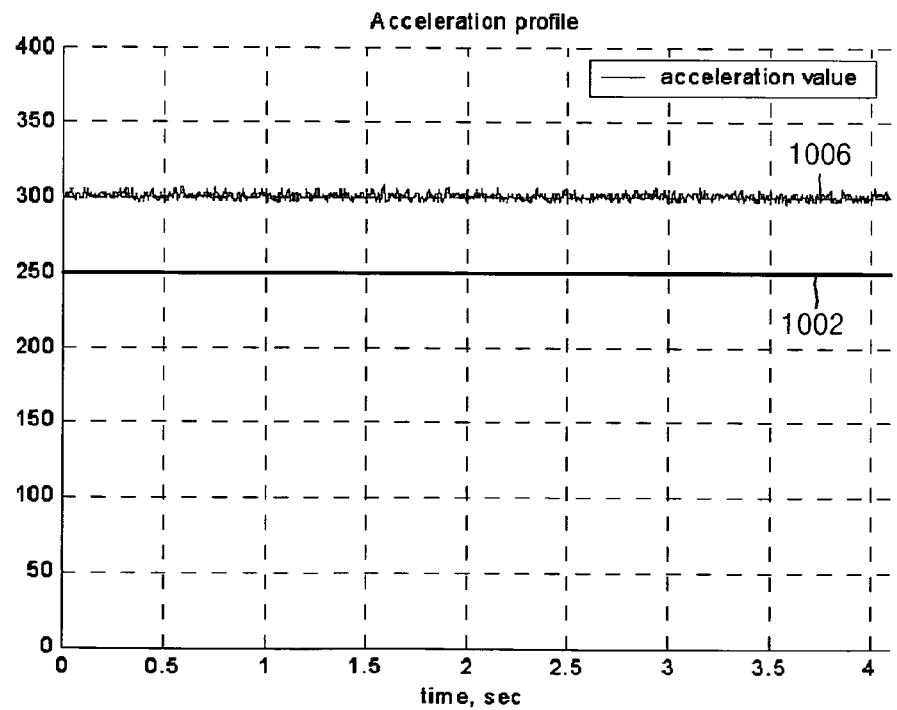

FIGS. 10A and 10B show the result obtained by performing an acceleration vector offset compensation operation by compensating for an acceleration value offset of a z-axis of an acceleration detector in accordance with an embodiment of the invention, wherein the z-axis is oriented substantially towards the center of the Earth.

In FIGS. 10A and 10B, a line 1002 represents an acceleration vector comprising no acceleration vector offset. In FIG. 10A, a curve 1004 represents a measured acceleration vector comprising an acceleration vector offset after an acceleration vector offset operation has been performed to compensate for that acceleration vector offset. In FIG. 10B, a curve 1006 represents a measured acceleration vector comprising an acceleration vector offset, wherein an acceleration vector offset compensation operation is not performed to compensate for that acceleration vector offset.

Referring to FIGS. 10A and 10B, as shown by the curves 1004 and 1006, the acceleration vector offset is significantly reduced (i.e., improved) by the acceleration vector offset compensation operation compared to when the operation is not performed.

FIG. 11 is a table illustrating results obtained by performing a free-fall detection false positive test. The test is performed 50 times on an HDD free-falling downwardly along a z-axis (indicated as Z-DOWN in FIG. 11), wherein the HDD uses the method for compensating for an acceleration vector offset in accordance with an embodiment of the invention, and 50 times on an HDD free-falling downwardly along a z-axis, wherein the HDD does not use the method. The test is also performed 50 times on an HDD free-falling while rotating randomly (indicated as RANDOM in FIG. 11), wherein the HDD uses the method for compensating for acceleration vector offset in accordance with an embodiment of the invention, and 50 times on an HDD free-falling while rotating randomly, wherein the HDD does not use the method.

Referring to FIG. 11, the number of false detections is significantly reduced by performing the offset compensation, with an improvement of about 50% for the random motion and about 80% for the z-down motion.

Figure 12:
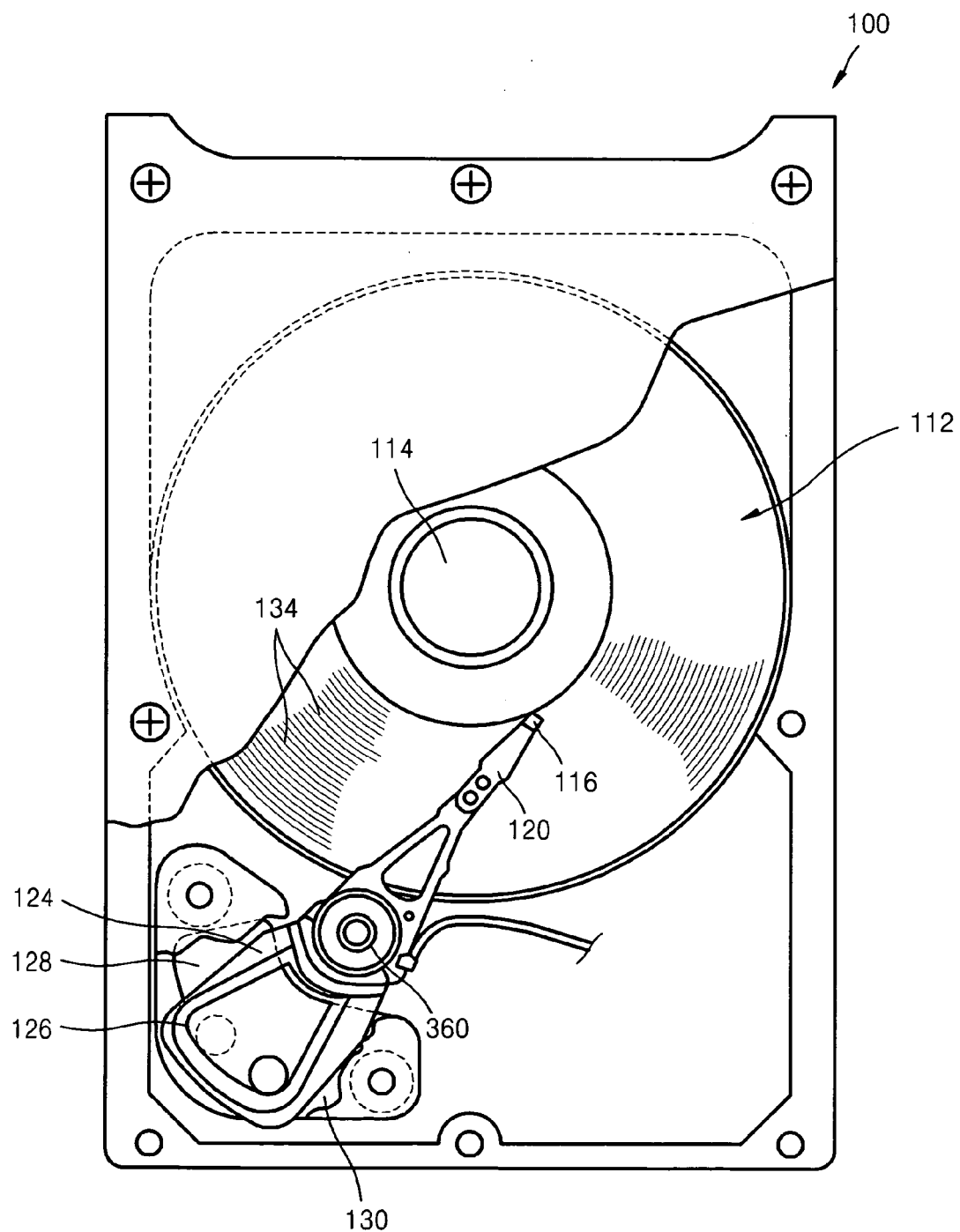
FIG. 12 is a schematic plan view of a hard disk drive (HDD) adapted to perform an acceleration vector offset compensation method in accordance with an embodiment of the invention; and, FIG. 13 is a block diagram of a control apparatus adapted to control the HDD illustrated in FIG. 12, in accordance with an embodiment of the invention.

FIG. 12 is a schematic plan view of an HDD 100 adapted to perform an acceleration vector offset compensation method in accordance with an embodiment of the invention.

Referring to FIG. 12, the HDD 100 comprises at least one disk 112 and a spindle motor 114 adapted to rotate the at least one disk 112. The HDD 100 also comprises at least one head 116 disposed above the surface of the disk 112.

The head 116 is adapted to read information from the rotating disk 112 by sensing a magnetic field on the surface of the disk 112, and is adapted to write information to the rotating disk 112 by magnetizing the surface of the disk 112. Though a single head 116 is shown in FIG. 12, the head 116 comprises a write head adapted to magnetize the disk 112 and a separate read head adapted to sense a magnetic field on the disk 112.

The head 116 can be mounted on a slider (not shown). The slider generates an air bearing between the head 116 and the surface of the disk 112. The slider is combined with a suspension 120. The suspension 120 is attached to a head stack assembly (HSA) 122. The HSA 122 is attached to an actuator arm 124 comprising a voice coil 126. The voice coil 126 is disposed adjacent to a magnetic assembly 128 adapted to support a voice coil motor (VCM) 130. A current provided to the voice coil 126 generates torque which rotates the actuator arm 124 around a bearing assembly 360. The rotation of the actuator arm 124 moves the head 116 across the surface of the disk 112.

Information is stored in concentric tracks of the disk 112. In general, the disk 112 comprises a data zone in which user data is recorded, a parking zone in which the head 116 is disposed when the HDD 100 is not being used, and a maintenance cylinder.

Figure 13:
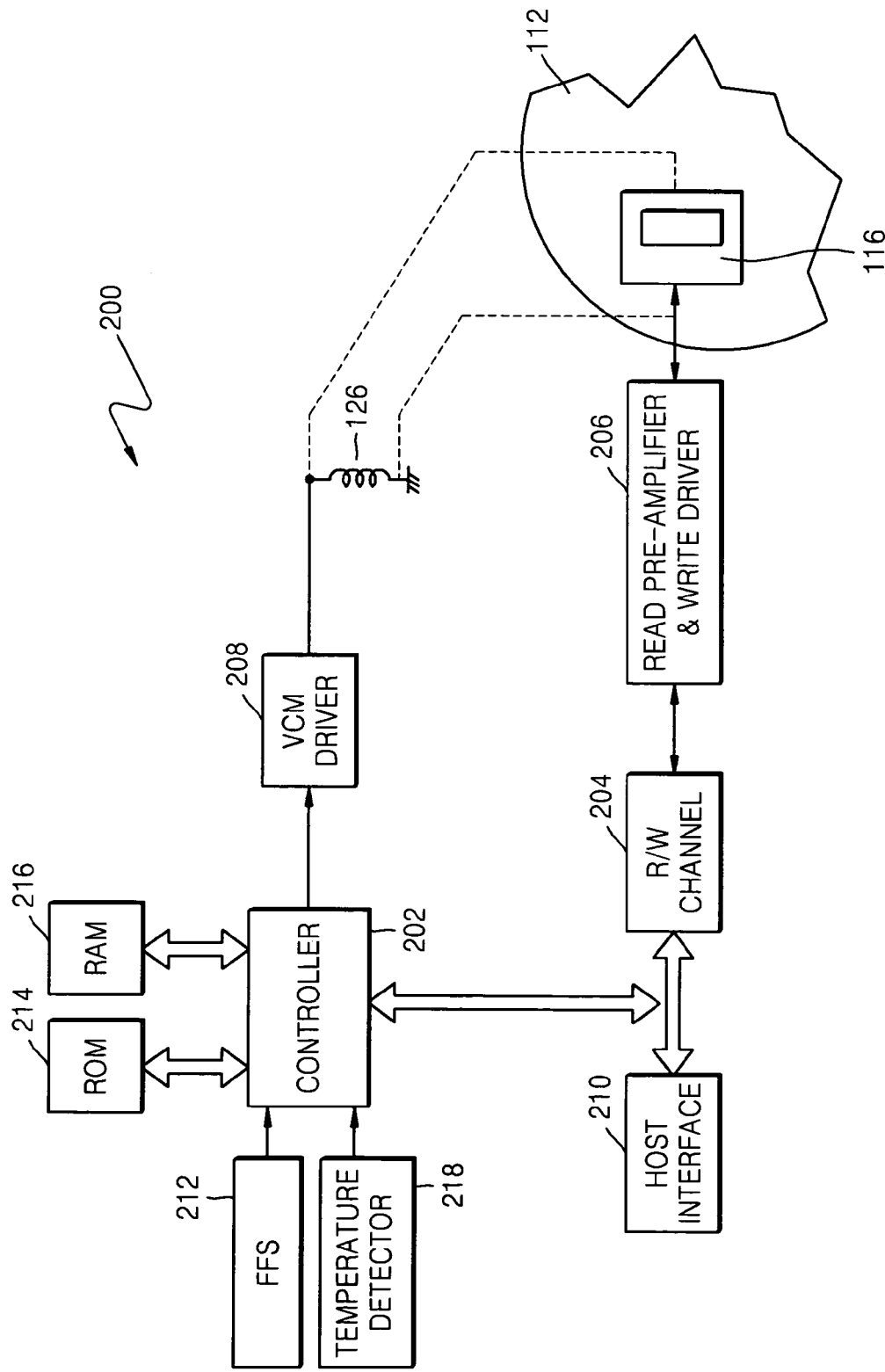

FIG. 13 is a block diagram of a control apparatus 200 adapted to control the HDD 100 illustrated in FIG. 12, in accordance with an embodiment of the invention.

Referring to FIG. 13, the control apparatus 200 comprises a controller 202 connected to the head 116 through a read/ write (RAN) channel circuit 204 and a read pre-amplifier & write drive circuit 206. The controller 202 is a digital signal processor (DSP), a microprocessor, or a micro-controller.

The controller 202 provides a control signal to the R/W channel circuit 204 in order to read data from or write data to the disk 112.

Information is typically transmitted from the R/W channel circuit 204 to a host interface circuit 210. The host interface circuit 210 comprises a control circuit (not shown) adapted to interface with a host computer (not shown) such a personal computer (PC).

In a read mode, the R/W channel circuit 204 is adapted to convert an analog signal read by the head 116 and amplified by the read pre-amplifier & write drive circuit 206 to a digital signal that a host computer can read, and output the digital signal to the host interface circuit 210. In a write mode, the R/W channel circuit 204 is adapted to receive user data from the host computer via the host interface circuit 210, convert the user data to a write current that can be recorded onto a disk, and output the write current to the read pre-amplifier & write drive circuit 206.

The controller 202 is also connected to a VCM driver 208 adapted to provide a driving current to the voice coil 126. The controller 202 is adapted to provide a control signal to the VCM driver 208 to control the VCM 130 and the motion of the head 116.

The controller 202 is also connected to a nonvolatile memory, such as a read only memory (ROM) 214 or a flash memory, and a random access memory (RAM) 216. The memories 214 and 216 store software routines and data, which are used by the controller 202 to control the HDD 100. One of the stored software routines is a software routine for performing the acceleration vector offset compensation operation illustrated in FIG. 6.

The controller 202 periodically performs the software routine for performing the acceleration vector offset compensation operation (i.e., for compensating for acceleration value offset in acceleration values measured by an FFS 212).

After the HDD 100 is initialized, the controller 202 performs the software routine for performing the acceleration vector offset compensation operation illustrated in FIG. 6 over a period of 2 seconds. The software routine compensates for an acceleration value offset in measured acceleration values measured by the FFS 212.

In the acceleration vector offset compensation operation, the controller 202 performs temperature compensation by determining measurement values of the FFS 212 at predetermined intervals. The controller 202 adjusts the temperature of the HDD in proportion to the difference between a reference temperature and the current temperature of the HDD obtained in accordance with a temperature detected by a temperature detector 218.

In addition, the controller 202 determines whether the FFS 212 is in a stable resting state and whether a main axis exists in compensating for acceleration value offset in measured acceleration values measured by the FFS 212.

In more detail, if the FFS 212 is determined to be in a stable resting state and it is determined that a main axis exists, the controller 202 obtains a compensation value for the main axis using an acceleration vector offset of an acceleration vector, the sign of the acceleration vector offset, a measured acceleration value for the main axis, and the sign of the measured acceleration value. The controller 202 then compensates for the acceleration value offset of the main axis and thereafter detects a free-fall state using measured acceleration vectors obtained using measured acceleration values obtained after the controller 202 has compensated for the acceleration value offset of the main axis.

Embodiments of the invention may take the form of a method, an apparatus, and/or a system. When an embodiment of the invention is implemented as software, components of the embodiment are implemented as code segments for executing required operations. A program or the code segments can be stored in a processor readable recording medium. The processor readable recording medium is any data storage device that can store data which can be read thereafter by a computer system. Examples of the processor readable recording medium include electronic circuits, semiconductor memory devices, read-only memory (ROM), flash memory, erasable ROM, floppy disks, optical discs, hard disks.

As described above, since an acceleration vector offset compensation method in accordance with an embodiment of the invention can reduce false detection of a free-fall state by compensating for acceleration value offset in acceleration values measured by an FFS (i.e., measured acceleration values), the reliability of an HDD can be improved because an HDD using the method can better protect itself from being damaged.

Although embodiments of the invention have been described herein, various changes in form and detail may be made therein by those skilled in the art without departing from the scope of the invention as defined by the accompanying claims.

What is claimed is:

1. A method for compensating for an acceleration vector offset of an acceleration detector adapted to output measured acceleration values for at least two orthogonal axes, the method comprising:
   determining whether the acceleration detector is in a stable resting state by evaluating measured acceleration vectors obtained during a first time period, wherein the measured acceleration vectors are calculated using the measured acceleration values;
   if the acceleration detector is determined to be in a stable resting state, then determining whether any one of the at least two orthogonal axes is a main axis using the measured acceleration values; and,
   if the acceleration detector is determined to be in a stable resting state and one of the at least two orthogonal axes is determined to be a main axis, performing an acceleration vector compensation operation to compensate for the acceleration vector offset of the acceleration detector.

2. The method of claim 1, wherein determining whether the acceleration detector is in a stable resting state comprises determining that the acceleration detector is in a stable resting state when:
   a variance of the measured acceleration vectors obtained during the first time period is less than a variance threshold; and,
   a mean value of the measured acceleration vectors obtained during the first time period is within a mean range.

3. The method of claim 2, wherein the first time period lasts for no more than 2 seconds.

4. The method of claim 1, wherein determining whether the acceleration detector is in a stable resting state comprises:
   applying a moving average to the measured acceleration vectors; and,
   determining that the acceleration detector is in a stable resting state when:

a variance of the measured acceleration vectors obtained during the first time period is less than a variance threshold; and,
a mean value of the measured acceleration vectors obtained during the first time period is within a mean range.

5. The method of claim 1, wherein:
determining whether any one of the at least two orthogonal axes is a main axis using the measured acceleration values comprises determining that a first axis of the at least two orthogonal axes is a main axis when the absolute value of a measured acceleration value for the first axis is greater than the sum of the absolute values of measured acceleration values for each of the remaining axes of the at least two orthogonal axes; and,
the measured acceleration values comprise both the measured acceleration value for the first axis and the measured acceleration values for each of the remaining axes of the at least two orthogonal axes.

6. The method of claim 1, wherein performing an acceleration vector compensation operation to compensate for the acceleration vector offset of the acceleration detector comprises:
calculating the acceleration vector offset; and,
compensating for an acceleration value offset for the main axis in accordance with the acceleration vector offset.

7. The method of claim 1, further comprising performing a temperature compensation operation before performing the acceleration vector compensation operation to compensate for the acceleration vector offset of the acceleration detector.

8. A computer-readable recording medium storing a program when executed by a processor perform method for compensating for an acceleration vector offset of an acceleration detector adapted to output measured acceleration values for at least two orthogonal axes, the method comprising:
determining whether the acceleration detector is in a stable resting state by evaluating measured acceleration vectors obtained during a first time period, wherein the measured acceleration vectors are calculated using the measured acceleration values;
if the acceleration detector is determined to be in a stable resting state, then determining whether any one of the at least two orthogonal axes is a main axis using the measured acceleration values; and,
if the acceleration detector is determined to be in a stable resting state and one of the at least two orthogonal axes is determined to be a main axis, performing an acceleration vector compensation operation to compensate for the acceleration vector offset of the acceleration detector.

9. The recording medium of claim 8, wherein determining whether the acceleration detector is in a stable resting state comprises determining that the acceleration detector is in a stable resting state when:
a variance of the measured acceleration vectors obtained during the first time period is less than a variance threshold; and,
a mean value of the measured acceleration vectors obtained during the first time period is within a mean range.

10. The recording medium of claim 9, wherein the first time period lasts for no more than 2 seconds.

11. The recording medium of claim 8, wherein determining whether the acceleration detector is in a stable resting state comprises:
applying a moving average to the measured acceleration vectors; and,
determining that the acceleration detector is in a stable resting state when:
a variance of the measured acceleration vectors obtained during the first time period is less than a variance threshold; and,
a mean value of the measured acceleration vectors obtained during the first time period is within a mean range.

12. The recording medium of claim 8, wherein:
determining whether any one of the at least two orthogonal axes is a main axis using the measured acceleration values comprises determining that a first axis of the at least two orthogonal axes is a main axis when the absolute value of a measured acceleration value for the first axis is greater than the sum of the absolute values of measured acceleration values for each of the remaining axes of the at least two orthogonal axes; and,
the measured acceleration values comprise both the measured acceleration value for the first axis and the measured acceleration values for each of the remaining axes of the at least two orthogonal axes.

13. The recording medium of claim 8, wherein performing an acceleration vector compensation operation to compensate for the acceleration vector offset of the acceleration detector comprises:
calculating the acceleration vector offset; and,
compensating for an acceleration value offset for the main axis in accordance with the acceleration vector offset.

14. The recording medium of claim 8, further comprising performing a temperature compensation operation before performing the acceleration vector compensation operation to compensate for the acceleration vector offset of the acceleration detector.

15. The recording medium of claim 8, wherein in the determination of whether the main axis exists, when an axis having an absolute value of an acceleration detection value greater than a sum of the absolute values of acceleration detection values of the other axes exists, the axis is determined to be the main axis.

16. The recording medium of claim 14, wherein in the compensation, an offset of the main axis is compensated for based on an offset of the acceleration vector.

17. An apparatus adapted to compensate for an acceleration vector offset of an acceleration detector, the apparatus comprising:
the acceleration detector, wherein the acceleration detector is adapted to output measured acceleration values for at least two orthogonal axes; and,
a controller adapted to compensate for the acceleration vector offset of the acceleration detector,
wherein the controller is adapted to:
determine whether the acceleration detector is in a stable resting state by evaluating measured acceleration vectors obtained during a first time period, wherein the measured acceleration vectors are calculated using the measured acceleration values;
determine whether any one of the at least two orthogonal axes is a main axis using the measured acceleration values, if the acceleration detector is determined to be in a stable resting state; and,
perform an acceleration vector compensation operation to compensate for the acceleration vector offset of the acceleration detector, if the acceleration detector is determined to be in a stable resting state and one of the at least two orthogonal axes is determined to be a main axis.

18. The apparatus of claim 17, wherein the controller is adapted to compensate for an acceleration value offset of the main axis in accordance with the acceleration vector offset.

* * * * *